March 12, 1940.      J. D. COLE      2,193,713
SHAFT AND BEARING ASSEMBLY
Filed April 7, 1938
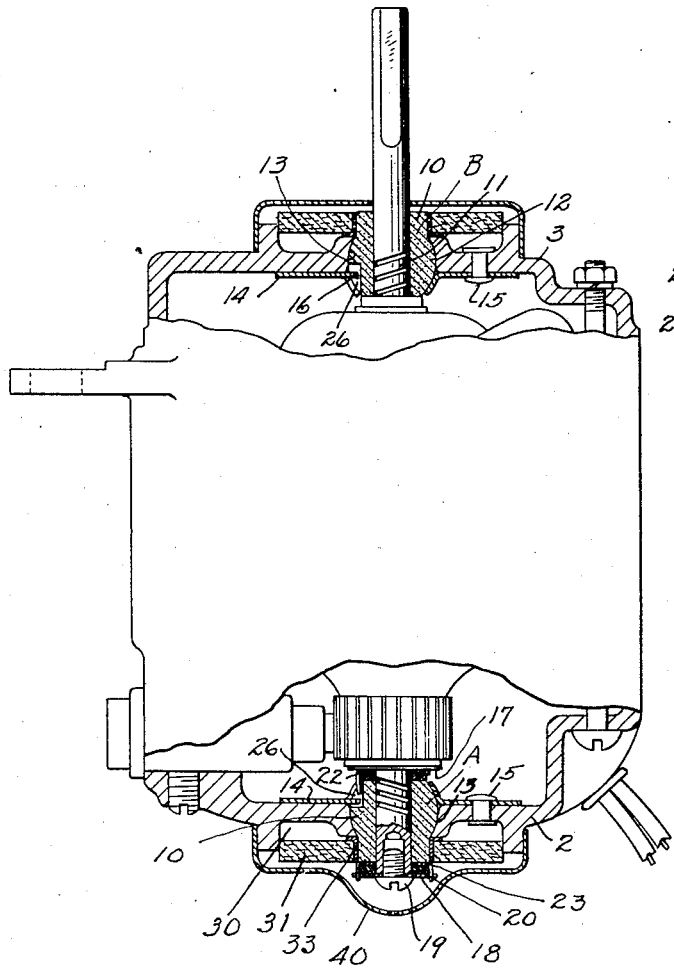
Fig. 1
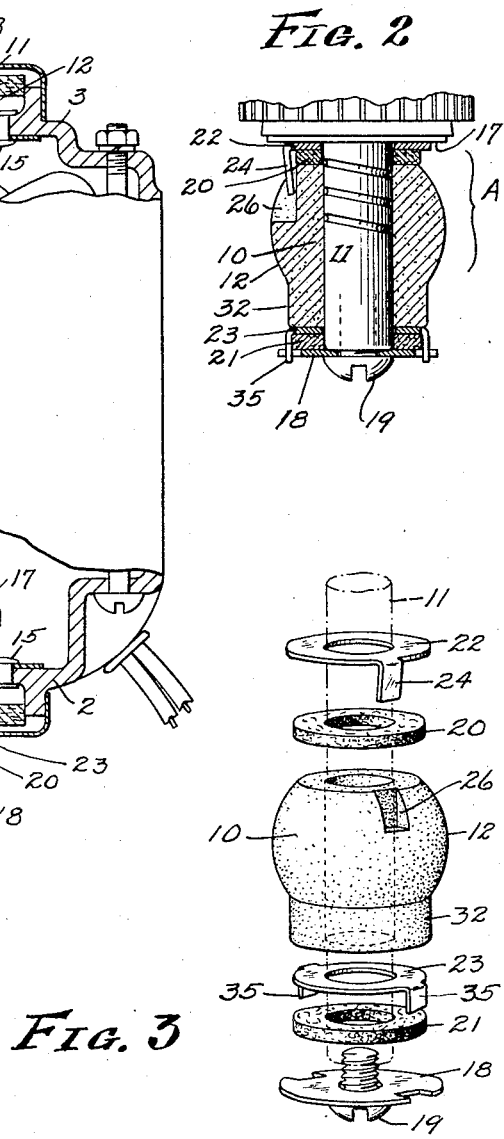
Fig. 2
Fig. 3
INVENTOR.
BY James D. Cole
Bates, Golrick & Teare
ATTORNEYS.

Patented Mar. 12, 1940

2,193,713

UNITED STATES PATENT OFFICE 2,193,713

SHAFT AND BEARING ASSEMBLY

James D. Cole, Kent, Ohio, assignor to The Black & Decker Electric Company, Kent, Ohio, a corporation of Ohio Application April 7, 1938, Serial No. 200,615

12 Claims. (Cl. 308—134.1)

This invention relates to a bearing assembly, and an object is to provide an improved bearing assembly which is especially adaptable for armature shafts of fractional horse-power motors and the like.

Another object is to provide an improved bearing assembly, especially adapted for use on small electric motors, which assembly will secure efficient lubrication of the armature shaft bearing and at the same time prevent travel of oil from the region of the bearing to parts likely to be impaired by the presence of oil.

A more specific object of the invention is the provision of a motor bearing assembly, especially adaptable for use with small electric motors, and which utilizes a composition lubricant-absorptive bearing member so arranged as to prevent the lubricant from traveling through the bearing material to the interior of the motor, irrespective of the direction of extent of the shaft.

In the past, composition metallic bearings which are porous or capable of absorbing and discharging lubricant—hence self oiling—have been used with some success on small electric motors and the like. Use of such material obviates the necessity for oil ducts, such as drilled holes, which can easily become clogged, and insures lubrication of the area of contact between the shaft and the bearing. Since the lubricant passes more readily through the material of the bearing, when the bearing reaches normal operating temperature, oil in excess of that required for effective lubrication is frequently drawn from the bearing into the motor housing, causing considerable damage especially when the oil reaches the commutator. This disadvantage in the use of oil absorptive bearing material is especially serious when the motor has to operate in an inclined or vertical position and the bearing is made to take axial as well as radial thrust, for such increases the temperature of the bearing, thereby reducing resistance to the passage of oil through it.

A further object of the present invention is to provide a bearing assembly, including oil absorptive bearing material, but which will eliminate the above discussed and other disadvantage heretofore found incident to its use.

Other objects of the invention will become apparent from the following description of the embodiment, illustrated. The essential characteristics are summarized in the claims.

In the drawing, which shows a preferred embodiment of the invention, Fig. 1 is a side view of an electric motor, parts of which are broken away in central section; Fig. 2 is a fragmentary axial section on a larger scale showing one bearing assembly and adjacent portion of the armature shaft; Fig. 3 is an exploded perspective view of the various parts of said bearing assembly.

My improved bearing assembly is especially adapted for use in fractional horsepower motors and may be used at either end of the armature shaft, although the greater advantage is obtained from its use at the commutator end of the armature. In the drawing, I have shown my improved bearing assembly as applied to a motor having a casing 1 provided with end walls 2 and 3 adapted to support respective bearing assemblies A and B. While the motor is adapted to operate with the armature in a vertical position as shown, it nevertheless operates equally as well in any position.

The bearing assemblies A and B are generally similar in construction and only the bearing assembly A will be described in detail. However, the parts of the assembly B which correspond to those of the assembly A will be given the same characters. The bearing construction of this invention may used at one end of the motor and a different construction at the other end, or identical construction may be used at both ends, as desired.

The improved bearing assembly A is illustrated at the lower end of Fig. 1, and comprises a bearing member 10 through which the armature shaft 11 extends. The bearing member is provided with a spherical portion 12 which coacts with a spherical seat 13 formed in the end of the casing, a retainer plate 14 is secured to the inner face of the end 2 of the motor casing by rivets 15 and retains the bearing member in the seat 13. The plate 14 is provided with a lug 16 which engages a notch 26 formed on the surface of the bearing member as shown in Fig. 3, and prevents relative rotation between the bearing member and the casing. Thus the bearing may rock slightly in the spherical seat to permit alignment of the bearings A and B but is restrained against axial and rotating movements.

The bearing assembly A prevents excessive axial movement of the armature. The bearing member is disposed between the end face 17 of the armature and a disc 18 which is secured to the end of the armature shaft by a screw 19. To compensate for variations of the sizes of the parts, compressible washers 20 and 21 are disposed between the ends of the bearing member and the armature and disc 18 respectively. These washers are preferably made of felt or other oil absorptive material for purposes hereinafter to be described. The washer 20 is therefore protected from the wearing action of the armature by a wearing washer 22 while the washer 21, which rotates with the armature shaft, is protected from the wearing action of the end of the bearing member by a wearing washer 23.

As heretofore mentioned the bearing member 10 is made of a liquid absorptive or porous material, through the body of which, lubricating oil may pass. For instance, this bearing member may be made of metallic granules or flakes pressed together to form a mass capable of supporting the armature. However, such bearing materials are well known in the art, and therefore are not described in detail herein. Suffice to say that such materials permit the flow of oil through the body of the bearing when subjected to operating temperatures without requiring special conduits through the bearings for the passage of wicks or other oil carrying devices, and have the advantage of lubricating the armature shaft throughout its entire contact with the bearing metal.

Bearing members made of porous materials have been used in the past, but as heretofore mentioned, not only have permitted but have induced the flow of lubricant through the bearing into the interior of the motor, where the lubricant interfered with the operation of the motor, as by coating the commutator and thus disturbing the electrical contact between the commutator and the brushes. This flow of lubricant has been induced by the heat generated between the contacting surface of the armature and the inner end of the bearing member, and the oil thus brought to the inner surface of the bearing member has been thrown outwardly by centrifugal force caused by the rapidly rotating armature. Where the motors were fan ventilated, the fan being secured to the armature shaft at the end opposite the commutator, the air currents thus induced also drew such oil toward the commutator. Likewise, as is true in most motors, there was a pulsating movement of the armature shaft in an axial direction which actually pumped the oil or lubricant from the bearing member and forced it outwardly into the motor housing.

In my improved bearing assembly I have in effect insulated the end face of the bearing from the heat generated by the contacting surfaces of the armature and bearing assembly by the use of the felt washer 20 which is disposed between the protecting or wearing washer 22 and the end of the armature. Thus the heat induced flow of lubricant to the interior of the motor is reduced. The washer 20 and the washer 21, both being compressible, permit the axial movement of the armature to be reduced to a minimum with safety, and further, they eliminate the pumping of lubricant by such pulsations as remain.

To eliminate the pumping and throwing of lubricant into the interior of the motor by centrifugal force I prevent rotation between the bearing member, the felt washer 20 and the wearing washer 22. I accomplish this by providing the wearing washer 22 with a tongue 24 which is bent inwardly and seats in the notch or slot 26 in the bearing member heretofore described.

The retaining of the felt washer 20 stationary also causes it to act as a wiper and oil retainer inasmuch as it prevents the oil from following the armature shaft into the interior of the motor. While this felt washer 20 aids in preventing the excess flow of oil or lubricant into the interior of the motor, it nevertheless does supply the co-acting surfaces of the armature and wearing washer 22 with sufficient lubricant to eliminate excessive wear or heat at this point.

The bearing material being porous or capable of permitting the flow of lubricant therethrough, it is convenient to use a comparatively large wick and lubricant storage reservoir, thus eliminating the need for frequent replenishing of the supply of lubricant. To this end the external face of the end of the motor casing is provided with an annular recess 30 into which a lubricant such as a light lubricating grease may be stored. Preferably, the grease is of such a type that it gives up lubricating oil when heated. The lubricant is retained in the recess 30 and transmitted to the bearing member by a felt or fabric wick in the form of an enlarged disc 31 which contacts with the outer surface of that portion 32 of the bearing member which protrudes axially from the casing. To facilitate the assembly the disc 31 may be mounted on a liquid absorbing ring 33 of any suitable material.

Not only does my improved bearing assembly eliminate the excess flow of lubricant into the interior of the motor casing, but it also induces the flow of such lubricant toward the exterior of the motor casing. This becomes a decided advantage when the motor operates at a temperature above normal which of course materially increases the flow of lubricant through the bearings. This induced flow is caused by rotating the washer 23 relative to the external or contacting face of the bearing and is accomplished by providing the washer 23 with a pair of ears or lugs 35 which are bent outwardly and engage the washer 18 which is fixedly secured to the armature shaft as heretofore described. Thus the heat generated between the bearing and the washer 23 causes the lubricant to flow toward the external end of the bearing member and there be thrown outwardly toward the wick 31 by the centrifugal force of the moving parts. The motor is provided with a suitable end cap 40 to guide such lubricant toward the wick.

The wick 31 continues to supply the bearing member 10 with oil through the collar 33 and when the supply of oil becomes diminished in the wick 31, this is in turn supplied from the reservoir 30, during intervals when the grease is heated and rendered partially fluid. Since very little oil is used up in the process, a continuous circuit of oil from the bearing member to the wick 31, and back to the bearing member 10 is maintained, so that the bearing can operate indefinitely without becoming dangerously dry. Since the principal problem is to prevent escape of oil to the brush-contacting face of the commutator, the felt washers and wearing discs may be omitted from the opposite end of the shaft, however, in some instances a similar assembly is found advantageous at both ends of the armature shaft.

I claim:

1. In a bearing having an apertured block of oil-absorptive material and a shaft supported in the aperture; the combination of oil-absorptive means on the shaft, adapted to receive oil exuding from the block, and means encircling the shaft and in axial contact with the absorptive means and adapted for end-thrust contact with a shoulder rigid with the shaft, and means to prevent relative movement between said first-named means and said block.

2. In a bearing having an apertured bearing member of oil-absorptive material and a shaft supported in the aperture and having a shoulder rigid therewith, an oil-absorptive washer mounted on said shaft, adapted to receive oil exuding from said bearing member and disposed between said bearing member and said shoulder, a non oil-absorptive washer encircling said shaft and disposed between said first named washer and said shoulder, and means to prevent relative rotation between said second-named washer and said shaft.

3. In a bearing having an apertured member of soil-absorptive material and a shaft having a shoulder rigid therewith, an oil absorptive compressible washer disposed between the end of said bearing member and said shoulder, and adapted to receive oil exuding from said bearing member, a non-oil-absorptive and non-compressible washer encircling said shaft and disposed between the first named washer and said shoulder and adapted to receive end-thrust of said shaft, and means carried by said second named washer and engaging said bearing member to prevent relative rotation between said bearing member and such washer.

4. In a bearing having an apertured block of oil-absorptive material, and a shaft supported in the aperture, the combination of a metal washer on the shaft adapted for axial running contact with an end surface of the block, an oil-absorptive disc adjacent the metal washer, and means on the shaft in axial abutment with the surface of the absorptive disc opposite the metal washer to cause said metallic washer to rotate with said shaft.

5. In a bearing having an apertured bearing member of oil-absorptive material, and a shaft supported in the aperture and having a shoulder thereon, means secured against rotation relative to said bearing member and disposed between one end of said bearing member and said shoulder, and means secured against rotation relative to said shaft and engaging the other end of said bearing.

6. In a bearing having an apertured block of oil-absorptive material, and a shaft supported in the aperture; the combination of a wick member in contact with the block at one end of it, oil-absorptive means on the shaft in substantially abutting relation to the same end of the block, and means to secure the oil-absorptive means on the shaft, so that it turns therewith and throws excess oil generally toward the region of the wick.

7. In a bearing, having an apertured block of oil-absorptive material, and a shaft supported in the aperture, a frame member having an opening supporting the external surface of the block, an oil-absorptive disc surrounding the block and in peripheral contact therewith, means forming a chamber for grease between the frame member and disc, and a washer assembly secured to the shaft in endwise adjacent relationship to the block, said assembly comprising two metallic washers embracing oil-absorptive material between them.

8. In a bearing having an apertured block of oil-absorptive material, and a shaft supported in the aperture, a frame member having an opening supporting the external surface of the block, an oil-absorptive apertured disc surrounding the block and in peripheral contact therewith, means forming a chamber for grease between the frame member and disc, means on the frame to supply oil to the block and a washer assembly secured to the shaft in endwise adjacent relationship to the block in the general region of the disc, externally of said chamber, said assembly comprising two metallic washers embracing cushioning, oil-absorptive material between them and means securing the two metallic washers together, including a bent lip on one of the washers engaging a notch in the rim of the other.

9. In a bearing for an electric motor having an armature shaft, said bearing comprising an apertured block of absorptive material adapted to support the armature shaft adjacent the commutator thereof, a metal washer between the block and commutator, adapted to bear axially on a shoulder of the armature in a direction toward the commutator, oil-absorptive means between the metallic washer and block adapted to receive oil exuded from the block, and means to secure the metallic washer to the block to prevent it from turning with the shaft.

10. A motor armature shaft bearing comprising an apertured block of oil-absorptive material, adapted to surround the armature shaft in running contact therewith, a plurality of washers surrounding the shaft at each end of the block, there being an oil-absorptive washer member and a metallic washer adjacent thereto at each end of the block, one metallic washer being in running contact with a shoulder on the armature and another metallic washer in retaining contact with the oil-absorptive washer at the end of the block opposite the armature.

11. In a bearing, having an apertured block of oil-absorptive material, and a shaft supported in the aperture, the combination of an annular wick member adapted to hold a supply of oil in contact with a peripheral surface of the block, near one end of it, means forming a cavity for grease adjacent the wick, and disc-like means on the shaft adjacent said end of the block and adapted to turn therewith and discharge oil therefrom radially of the shaft and generally across one face of the wick.

12. In a bearing having an apertured block of oil absorptive material, and a shaft supported in the aperture, the combination of an annular wick member adapted to hold a supply of lubricant in contact with the peripheral surface of the block, means forming a cavity in communication with the wick and into which cavity the shaft extends, and disc-like means adapted to turn with the shaft and adapted to discharge lubricant radially into said cavity, said cavity being provided with walls arranged and adapted to divert such discharged lubricant toward said wick, said last-named means including a metallic disc encircling said shaft, and in contact with the end of said bearing, a second disc secured to said shaft, a non-metallic disc encircling said shaft and disposed between said metallic discs, one of said metallic discs being provided with notches and the other having ears projecting into said notches.

JAMES D. COLE.